(12) United States Patent
Studer et al.

(10) Patent No.: US 11,479,047 B2
(45) Date of Patent: Oct. 25, 2022

(54) PRINT LIQUID SUPPLY UNITS

(71) Applicant: Hewlett-Packard Development Company, L.P., Spring, TX (US)

(72) Inventors: Anthony Donald Studer, Albany, OR (US); David Olsen, Corvallis, OR (US); Quinton Buford Weaver, Albany, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/768,598

(22) PCT Filed: Sep. 10, 2019

(86) PCT No.: PCT/US2019/050445
§ 371 (c)(1),
(2) Date: May 29, 2020

(87) PCT Pub. No.: WO2020/117349
PCT Pub. Date: Jun. 11, 2020

(65) Prior Publication Data
US 2021/0237461 A1    Aug. 5, 2021

(30) Foreign Application Priority Data

Dec. 3, 2018  (WO) ................. PCT/US2018/063643
Apr. 5, 2019  (WO) ................. PCT/US2019/026145
(Continued)

(51) Int. Cl.
*B41J 2/175*     (2006.01)
*G06F 21/44*     (2013.01)
(Continued)

(52) U.S. Cl.
CPC ....... *B41J 2/17546* (2013.01); *B41J 2/17526* (2013.01); *B41J 2/17566* (2013.01);
(Continued)

(58) Field of Classification Search
CPC .......................... B41J 2/17566; B41J 2/17526
See application file for complete search history.

(56) References Cited

U.S. PATENT DOCUMENTS 3,109,125 A   10/1963   Wachowiak
3,553,483 A   1/1971    Jarvis
(Continued)

FOREIGN PATENT DOCUMENTS

AU    2014202104 A1    5/2014
CA       2507422 A1    1/2002
(Continued)

OTHER PUBLICATIONS

Arnostech, "Thermal Inkjet Printers," retrieved from http://www.arnostech.com/machines/coding-systems/thermal-inkjet-printers/, last retrieved on Jul. 1, 2019, 3 pages.
(Continued)

*Primary Examiner* — Jason S Uhlenhake
(74) *Attorney, Agent, or Firm* — Austin Rapp

(57) ABSTRACT

Examples of a print liquid supply unit are described herein. In some examples, the print liquid supply unit includes a first housing component including an alignment feature. In some examples, the print liquid supply unit includes sensor circuitry. In some examples, the print liquid supply unit includes a sensor support secured to the first housing component with the alignment feature.

22 Claims, 9 Drawing Sheets

(30) Foreign Application Priority Data

| | | | |
|---|---|---|---|
| Jul. 18, 2019 | (WO) | ............... | PCT/US2019/042465 |
| Jul. 18, 2019 | (WO) | ............... | PCT/US2019/042466 |
| Jul. 18, 2019 | (WO) | ............... | PCT/US2019/042467 |

(51) Int. Cl.
*G06F 21/74* (2013.01)
*G06F 21/85* (2013.01)

(52) U.S. Cl.
CPC .............. *G06F 21/44* (2013.01); *G06F 21/74* (2013.01); *G06F 21/85* (2013.01)

(56) References Cited

U.S. PATENT DOCUMENTS

| | | | |
|---|---|---|---|
| 3,614,576 A | 10/1971 | Raphael | |
| 4,074,284 A | 2/1978 | Dexter et al. | |
| 4,503,441 A | 3/1985 | Tamukai | |
| 4,506,276 A | 3/1985 | Kyser et al. | |
| 4,639,738 A | 1/1987 | Young et al. | |
| 4,734,787 A | 3/1988 | Hayashi | |
| 5,001,596 A | 3/1991 | Hart | |
| 5,045,811 A | 9/1991 | Lewis | |
| 5,079,570 A | 1/1992 | Mohr et al. | |
| 5,142,909 A | 9/1992 | Baughman | |
| 5,329,254 A | 7/1994 | Takano | |
| 5,438,351 A | 8/1995 | Trenchard et al. | |
| 5,471,176 A | 11/1995 | James et al. | |
| 5,583,544 A | 12/1996 | Stamer et al. | |
| 5,680,960 A | 10/1997 | Keyes et al. | |
| 5,682,184 A | 10/1997 | Stephany et al. | |
| 5,699,091 A | 12/1997 | Bullock | |
| 5,731,824 A | 3/1998 | Kneezel et al. | |
| 5,751,323 A | 5/1998 | Swanson | |
| 5,757,406 A | 5/1998 | Kaplinsky | |
| 5,777,646 A | 7/1998 | Barinaga | |
| 5,777,943 A | 7/1998 | Kim et al. | |
| 5,788,388 A | 8/1998 | Cowger et al. | |
| 5,861,780 A | 1/1999 | Fukuda | |
| 5,975,688 A | 11/1999 | Kanaya et al. | |
| 6,068,363 A | 5/2000 | Saito | |
| 6,098,457 A | 8/2000 | Poole | |
| 6,151,039 A | 11/2000 | Hmelar et al. | |
| 6,164,766 A | 12/2000 | Erickson | |
| 6,175,929 B1 | 1/2001 | Hsu et al. | |
| 6,219,933 B1 | 4/2001 | Taniguchi | |
| 6,299,275 B1 | 10/2001 | Anderson | |
| 6,312,074 B1 | 11/2001 | Walker | |
| 6,341,853 B1 | 1/2002 | Scheffelin et al. | |
| 6,386,693 B1 | 5/2002 | Michele | |
| 6,402,299 B1 | 6/2002 | DeMeerleer | |
| 6,412,901 B2 | 7/2002 | Su et al. | |
| 6,431,670 B1 | 8/2002 | Schantz et al. | |
| 6,456,802 B1 | 9/2002 | Phillips | |
| 6,457,355 B1 | 10/2002 | Philipp | |
| 6,494,553 B1 | 12/2002 | Donahue et al. | |
| 6,494,568 B2 | 12/2002 | Hou et al. | |
| 6,598,963 B1 | 7/2003 | Yamamoto et al. | |
| 6,641,240 B2 | 11/2003 | Hsu et al. | |
| 6,641,243 B2 | 11/2003 | Anderson et al. | |
| 6,648,434 B2 | 11/2003 | Walker et al. | |
| 6,685,290 B1 | 2/2004 | Farr et al. | |
| 6,736,497 B2 | 5/2004 | Jung | |
| 6,796,644 B1 | 9/2004 | Anderson, Jr. et al. | |
| 6,802,581 B2 | 10/2004 | Hasseler et al. | |
| 6,802,602 B2 | 10/2004 | Sakai et al. | |
| 6,811,250 B2 | 11/2004 | Buchanan et al. | |
| 6,902,256 B2 | 6/2005 | Anderson et al. | |
| 6,908,179 B2 | 6/2005 | Pan et al. | |
| 6,959,599 B2 | 11/2005 | Feldstein et al. | |
| 6,966,222 B2 | 11/2005 | Carson et al. | |
| 6,969,137 B2 | 11/2005 | Maeda | |
| 7,039,734 B2 | 5/2006 | Sun et al. | |
| 7,077,506 B2 | 7/2006 | Chen | |
| 7,155,972 B2 | 1/2007 | Kosugi | |
| 7,171,323 B2 | 1/2007 | Shipton et al. | |
| 7,240,130 B2 | 7/2007 | Larson | |
| 7,260,662 B2 | 8/2007 | Moriwaki et al. | |
| 7,328,115 B2 | 2/2008 | Shipton et al. | |
| 7,380,042 B2 | 5/2008 | Wang et al. | |
| 7,458,656 B2 | 12/2008 | Smith | |
| 7,533,960 B2 | 5/2009 | Yasuda et al. | |
| 7,547,082 B2 | 6/2009 | Lee et al. | |
| 7,630,304 B2 | 12/2009 | Larson et al. | |
| 7,686,423 B2 | 3/2010 | Sato et al. | |
| 7,740,347 B2 | 6/2010 | Silverbrook et al. | |
| 7,775,638 B2 | 8/2010 | Hirosawa et al. | |
| 7,841,712 B2 | 11/2010 | Muyskens et al. | |
| 7,886,197 B2 | 2/2011 | Wegman | |
| 7,890,690 B2 | 2/2011 | Naderi et al. | |
| 7,970,042 B2 | 6/2011 | Lexmark | |
| 8,040,215 B2 | 10/2011 | Zakriti | |
| 8,161,224 B2 | 4/2012 | Laurencin et al. | |
| 8,215,018 B2 | 7/2012 | Morita et al. | |
| 8,220,910 B2 | 7/2012 | Wanibe | |
| 8,224,602 B2 | 7/2012 | Lory et al. | |
| 8,289,788 B2 | 10/2012 | Asauchi | |
| 8,331,581 B2 | 12/2012 | Pennock | |
| 8,348,377 B2 | 1/2013 | Asauchi | |
| 8,350,628 B1 | 1/2013 | George et al. | |
| 8,364,859 B2 | 1/2013 | Sato | |
| 8,386,657 B2 | 2/2013 | Adkins et al. | |
| 8,393,718 B2 | 3/2013 | Kida et al. | |
| 8,393,721 B2 | 3/2013 | Katoh et al. | |
| 8,429,437 B2 | 4/2013 | Asauchi | |
| 8,432,421 B2 | 4/2013 | Muraki et al. | |
| 8,438,919 B2 | 5/2013 | Phillips et al. | |
| 8,454,137 B2 | 6/2013 | Price et al. | |
| 8,556,394 B2 | 10/2013 | Chen | |
| 8,558,577 B1 | 10/2013 | Soriano Fosas et al. | |
| 8,562,091 B2 | 10/2013 | Sabanovic et al. | |
| 8,591,012 B2 | 11/2013 | Yoshino et al. | |
| 8,608,276 B2 | 12/2013 | Oohashi et al. | |
| 8,621,116 B2 | 12/2013 | Fister et al. | |
| 8,651,614 B2 | 2/2014 | Sakamoto | |
| 8,651,643 B2 * | 2/2014 | Harvey | ............... B41J 2/1752 347/86 |
| 8,721,059 B2 | 5/2014 | Kodama et al. | |
| 8,721,203 B2 | 5/2014 | Ehrhardt, Jr. | |
| 8,752,943 B2 | 6/2014 | Hirano | |
| 8,864,277 B2 | 10/2014 | Rice et al. | |
| 8,876,257 B2 | 11/2014 | Harada et al. | |
| 8,888,207 B2 | 11/2014 | Furness, III | |
| 8,892,798 B2 | 11/2014 | Tailliet et al. | |
| 8,898,358 B2 | 11/2014 | DeCesaris et al. | |
| 8,978,487 B2 | 3/2015 | Fergusson et al. | |
| 8,990,467 B2 | 3/2015 | Saito | |
| 9,079,414 B2 | 7/2015 | Lester et al. | |
| 9,108,448 B1 | 8/2015 | Bergstedt | |
| 9,132,656 B2 | 9/2015 | Nicholson, III et al. | |
| 9,137,093 B1 | 9/2015 | Abraham | |
| 9,176,921 B2 | 11/2015 | Fister et al. | |
| 9,194,734 B2 | 11/2015 | Mehrer | |
| 9,213,396 B1 | 12/2015 | Booth et al. | |
| 9,213,927 B1 | 12/2015 | Ahne et al. | |
| 9,254,661 B2 | 2/2016 | Otaka et al. | |
| 9,298,908 B1 | 3/2016 | Booth et al. | |
| 9,370,934 B2 | 6/2016 | Asauchi et al. | |
| 9,400,204 B2 | 7/2016 | Schoenberg | |
| 9,413,356 B1 | 8/2016 | McKinley | |
| 9,413,359 B2 | 8/2016 | Stirk | |
| 9,454,504 B2 | 9/2016 | Evans | |
| 9,483,003 B2 | 11/2016 | Thacker, III | |
| 9,487,017 B2 | 11/2016 | Ge et al. | |
| 9,496,884 B1 | 11/2016 | Azenkot et al. | |
| 9,511,596 B2 | 12/2016 | Anderson et al. | |
| 9,561,662 B2 | 2/2017 | Ward et al. | |
| 9,582,443 B1 | 2/2017 | Switzer et al. | |
| 9,599,500 B2 | 3/2017 | Ge et al. | |
| 9,619,663 B2 | 4/2017 | Refstrup | |
| 9,671,820 B2 | 6/2017 | Maruyama et al. | |
| 9,734,121 B2 | 8/2017 | Pitigoi-Aron et al. | |
| 9,738,087 B2 | 8/2017 | Kato | |
| 9,746,799 B2 | 8/2017 | Jeran | |

(56) References Cited

U.S. PATENT DOCUMENTS

| | | |
|---|---|---|
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo Navarro et al. |
| 10,031,882 B2 | 7/2018 | Srivastava et al. |
| 10,052,878 B2 | 8/2018 | Benneton |
| 10,107,667 B2 | 10/2018 | Cumbie et al. |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Campbell-Brown et al. |
| 10,259,230 B2 | 4/2019 | Asauchi |
| 10,279,594 B2 | 5/2019 | Horade |
| 10,338,838 B2 | 7/2019 | Olarig |
| 10,412,461 B2 | 9/2019 | Long |
| 10,471,725 B2 | 11/2019 | Esterberg |
| 10,875,318 B1 | 12/2020 | Gardner |
| 10,894,423 B2 | 1/2021 | Gardner |
| 11,034,157 B2 | 6/2021 | Gardner |
| 2001/0029554 A1 | 10/2001 | Namba |
| 2001/0033316 A1 | 10/2001 | Eida |
| 2002/0012016 A1 | 1/2002 | Wilson |
| 2002/0012616 A1 | 1/2002 | Zhou et al. |
| 2002/0033855 A1 | 3/2002 | Kubota et al. |
| 2002/0109761 A1 | 8/2002 | Shimizu et al. |
| 2002/0129650 A1 | 9/2002 | Zimmermann |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1 | 4/2003 | Tsukada et al. |
| 2003/0202024 A1 | 10/2003 | Corrigan |
| 2004/0021711 A1 | 2/2004 | Hasseler |
| 2004/0036733 A1 | 2/2004 | Kubota et al. |
| 2004/0085382 A1 | 5/2004 | Kosugi et al. |
| 2004/0095444 A1 | 5/2004 | Drummond et al. |
| 2004/0155913 A1 | 8/2004 | Kosugi et al. |
| 2004/0252146 A1 | 12/2004 | Naka |
| 2005/0010910 A1 | 1/2005 | Lindhorst et al. |
| 2005/0093910 A1 | 5/2005 | Im |
| 2005/0125105 A1 | 6/2005 | Halstead |
| 2005/0126282 A1 | 6/2005 | Maatuk |
| 2005/0185595 A1 | 8/2005 | Lee |
| 2005/0229699 A1 | 10/2005 | Chai et al. |
| 2006/0000810 A1 | 1/2006 | Kerr et al. |
| 2006/0007253 A1 | 1/2006 | Kosugi |
| 2006/0007295 A1 | 1/2006 | Ueda |
| 2006/0072952 A1 | 4/2006 | Walmsley |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong et al. |
| 2007/0024650 A1 | 2/2007 | Reinten et al. |
| 2007/0068249 A1 | 3/2007 | Eguchi |
| 2007/0088816 A1 | 4/2007 | Hrustemovic et al. |
| 2007/0115307 A1 | 5/2007 | Smith |
| 2007/0146409 A1 | 6/2007 | Kubota et al. |
| 2007/0247497 A1 | 10/2007 | Buchanan |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Cheung et al. |
| 2008/0165232 A1 | 7/2008 | Yuen |
| 2008/0192074 A1 | 8/2008 | Dubois |
| 2008/0211838 A1 | 9/2008 | Zhang |
| 2008/0246626 A1 | 10/2008 | Sheafor et al. |
| 2008/0298455 A1 | 12/2008 | Ilia et al. |
| 2008/0307134 A1 | 12/2008 | Geissler et al. |
| 2009/0013779 A1 | 1/2009 | Usui |
| 2009/0021766 A1 | 1/2009 | Yamazaki |
| 2009/0177823 A1 | 7/2009 | Chao |
| 2009/0179678 A1 | 7/2009 | Hardin |
| 2009/0290005 A1 | 11/2009 | Wanibe |
| 2009/0309941 A1* | 12/2009 | Price ................. B41J 2/17506 347/86 |
| 2010/0082271 A1 | 4/2010 | McCann et al. |
| 2010/0138745 A1 | 6/2010 | McNamara |
| 2010/0205350 A1 | 8/2010 | Bryant-Rich |
| 2010/0220128 A1 | 9/2010 | Zaba |
| 2010/0248208 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |
| 2011/0279530 A1 | 11/2011 | Love |
| 2011/0285027 A1 | 11/2011 | Lee |
| 2012/0128379 A1 | 5/2012 | Takeda |
| 2012/0243559 A1 | 9/2012 | Pan |
| 2012/0284429 A1 | 11/2012 | Adkins et al. |
| 2012/0299989 A1 | 11/2012 | Prothon |
| 2013/0018513 A1 | 1/2013 | Metselaar |
| 2013/0054933 A1 | 2/2013 | Fister |
| 2013/0067015 A1 | 3/2013 | Vasters |
| 2013/0067016 A1 | 3/2013 | Adkins |
| 2013/0155142 A1 | 6/2013 | Browning et al. |
| 2013/0155157 A1 | 6/2013 | Harvey et al. |
| 2013/0250024 A1* | 9/2013 | Kakishima ................. B41J 2/18 347/108 |
| 2013/0295245 A1 | 11/2013 | Gardner |
| 2014/0040517 A1 | 2/2014 | Fister et al. |
| 2014/0095750 A1 | 4/2014 | Tailliet |
| 2014/0164660 A1 | 6/2014 | DeCesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin |
| 2014/0372652 A1 | 12/2014 | Shu |
| 2014/0375321 A1 | 12/2014 | Ikeya |
| 2014/0375730 A1* | 12/2014 | Campbell-Brown ........................ B41J 2/1753 347/86 |
| 2015/0028671 A1 | 1/2015 | Ragaini |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth |
| 2016/0114590 A1 | 4/2016 | Arpin |
| 2016/0279962 A1 | 9/2016 | Ishida et al. |
| 2016/0357691 A1 | 12/2016 | Ahne |
| 2016/0364305 A1 | 12/2016 | Pitigou-Aron |
| 2016/0368273 A1 | 12/2016 | Ishikawa |
| 2017/0032135 A1 | 2/2017 | Refstrup |
| 2017/0050383 A1 | 2/2017 | Bell |
| 2017/0100941 A1 | 4/2017 | Kuribayashi |
| 2017/0144448 A1 | 5/2017 | Smith |
| 2017/0157929 A1* | 6/2017 | Yokoo ........................ B41J 2/01 |
| 2017/0168976 A1 | 6/2017 | Yost et al. |
| 2017/0169623 A1 | 6/2017 | Chen |
| 2017/0182786 A1 | 6/2017 | Angulo Navarro |
| 2017/0189011 A1 | 7/2017 | Stone et al. |
| 2017/0194913 A1 | 7/2017 | Wilson et al. |
| 2017/0230540 A1 | 8/2017 | Sasaki |

(56) References Cited

U.S. PATENT DOCUMENTS

| | | |
|---|---|---|
| 2017/0330449 A1 | 11/2017 | Lunardhi |
| 2018/0050537 A1 | 2/2018 | Bakker et al. |
| 2018/0100753 A1 | 4/2018 | Cumbie et al. |
| 2018/0143935 A1 | 5/2018 | Cox |
| 2018/0157943 A1 | 6/2018 | Fister et al. |
| 2018/0162137 A1 | 6/2018 | Van Brocklin et al. |
| 2018/0212593 A1 | 7/2018 | Usuda |
| 2018/0264808 A1 | 9/2018 | Bakker et al. |
| 2018/0281394 A1 | 10/2018 | Horade |
| 2018/0281438 A1 | 10/2018 | Horade |
| 2018/0290457 A1 | 10/2018 | Ge |
| 2018/0302110 A1 | 10/2018 | Solan |
| 2018/0304640 A1 | 10/2018 | Horne |
| 2019/0004991 A1 | 1/2019 | Foust et al. |
| 2019/0011306 A1 | 1/2019 | Cumbie et al. |
| 2019/0012663 A1 | 1/2019 | Masters |
| 2019/0013731 A1 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1 | 4/2019 | Anderson |
| 2019/0118527 A1 | 4/2019 | Anderson et al. |
| 2019/0126631 A1 | 5/2019 | Anderson et al. |
| 2019/0137316 A1 | 5/2019 | Anderson |
| 2019/0138484 A1 | 5/2019 | De Santiago Dominguez et al. |
| 2019/0217628 A1 | 7/2019 | Horade et al. |
| 2019/0226930 A1* | 7/2019 | Cumbie .................. B41J 2/175 |
| 2019/0240985 A1 | 8/2019 | Ge |
| 2020/0159689 A1 | 5/2020 | Koshisaka |
| 2021/0334392 A1 | 10/2021 | Panshin |

FOREIGN PATENT DOCUMENTS

| | | |
|---|---|---|
| CN | 1259091 A | 7/2000 |
| CN | 2603934 | 2/2004 |
| CN | 2734479 | 10/2005 |
| CN | 1840346 A | 10/2006 |
| CN | 1840349 A | 10/2006 |
| CN | 201761148 | 3/2011 |
| CN | 102231054 | 11/2011 |
| CN | 103171293 A | 6/2013 |
| CN | 203651218 U | 6/2014 |
| CN | 102736627 | 12/2014 |
| CN | 103879149 B | 6/2015 |
| CN | 105760318 A | 7/2016 |
| CN | 107209743 A | 9/2017 |
| CN | 108463703 A | 8/2018 |
| CN | 108819486 | 11/2018 |
| CN | 209014461 U | 6/2019 |
| DE | 3712699 C2 | 3/1989 |
| EP | 0015954 A1 | 6/1984 |
| EP | 0720916 A2 | 7/1996 |
| EP | 1285764 | 2/2003 |
| EP | 0994779 B1 | 4/2003 |
| EP | 1314565 A2 | 5/2003 |
| EP | 1238811 B1 | 12/2006 |
| EP | 1800872 | 6/2007 |
| EP | 1389531 | 7/2007 |
| EP | 1164022 B1 | 7/2008 |
| EP | 1524120 B1 | 9/2008 |
| EP | 2237163 | 10/2010 |
| EP | 1839872 B1 | 11/2010 |
| EP | 2385468 | 11/2011 |
| EP | 2854063 | 6/2019 |
| EP | 3208736 | 12/2019 |
| GB | 2519181 | 4/2015 |
| JP | H04220353 | 8/1992 |
| JP | 2001292133 | 10/2001 |
| JP | 2002026471 A | 1/2002 |
| JP | 2003326726 | 11/2003 |
| JP | 2005262458 A * | 9/2005 |
| JP | 2009258604 | 11/2009 |
| JP | 2010079199 | 4/2010 |
| JP | 2011113336 | 6/2011 |
| JP | 2012063770 | 3/2012 |
| JP | 2013197677 | 9/2013 |
| JP | 5644052 B2 | 12/2014 |
| JP | 2014534917 | 12/2014 |
| JP | 2015-066844 A | 4/2015 |
| JP | 2016185664 | 10/2016 |
| JP | 2017196842 | 11/2017 |
| JP | 2018049141 | 3/2018 |
| JP | 2018136774 | 8/2018 |
| JP | 2018161785 | 10/2018 |
| JP | 2018531394 | 10/2018 |
| KR | 20080003539 A | 1/2008 |
| KR | 101785051 | 10/2017 |
| TW | 200707209 A | 2/2007 |
| TW | 201202948 A | 1/2012 |
| TW | 201546620 A | 12/2015 |
| WO | WO-2007107957 A1 | 9/2007 |
| WO | WO-2017174363 | 10/2007 |
| WO | WO-2008117194 A1 | 10/2008 |
| WO | WO-2009145774 A1 | 12/2009 |
| WO | WO-2012020443 | 2/2012 |
| WO | WO-2012054050 | 4/2012 |
| WO | WO-2012057755 A1 | 5/2012 |
| WO | 2014/126547 A1 | 8/2014 |
| WO | WO-2015116092 | 8/2015 |
| WO | WO-2016061480 | 4/2016 |
| WO | WO-2016114759 | 7/2016 |
| WO | WO-2016130157 | 8/2016 |
| WO | WO-2013048430 | 5/2017 |
| WO | WO-2017074334 A1 | 5/2017 |
| WO | WO-2017074342 | 5/2017 |
| WO | WO-2017074342 A1 | 5/2017 |
| WO | WO-2017184147 A1 | 10/2017 |
| WO | WO-2017189009 | 11/2017 |
| WO | WO-2017189010 A1 | 11/2017 |
| WO | WO-2017189011 | 11/2017 |
| WO | WO-2017189013 | 11/2017 |
| WO | WO-2018017066 | 1/2018 |
| WO | WO-2018022038 | 2/2018 |
| WO | 2018/063379 A1 | 4/2018 |
| WO | WO-2018186847 A1 | 10/2018 |
| WO | WO-2018199886 | 11/2018 |
| WO | WO-2018199891 | 11/2018 |
| WO | WO-2018199895 | 11/2018 |
| WO | WO-2018217185 A1 | 11/2018 |
| WO | WO-2019017963 A1 | 1/2019 |
| WO | WO-2019078834 A1 | 4/2019 |
| WO | WO-2019078835 | 4/2019 |
| WO | WO-2019078839 | 4/2019 |
| WO | WO-2019078840 | 4/2019 |
| WO | WO-2019078843 | 4/2019 |
| WO | WO-2019078844 | 4/2019 |
| WO | WO-2019078845 | 4/2019 |

OTHER PUBLICATIONS

Epson, "Epson provides the best inks for the job," retrieved from https://www.epson.co.nz/microsite/excellence/inks_why.asp, ast retrieved on Jul. 1, 2019, 3 pages.

HP, "Development of the HP DeskJet 1200C Print Cartridge Platform", Feb. 1994, 9 pages.

Maxim Integrated Products "1-to-8 I2C Bus Switches/Multiplexers with Bus Lock-Up Detection, Isolation, and Notification" dated Sep. 2008, 22 pages.

NXP "Introducing A10006 Secure Authenticator Tamper-Resistant Anti Counterfeit Solution", last retrieved on Jul. 3, 2019, 29 pages.

NXP Semiconductors N.V. "NXP 2-, 4-, and 8-channel I2C/SMBus muxes and switches PCA954x" released Apr. 1, 2014, 34 pages.

NXP Semiconductors N.V. "PCA9641: 2-channel I2C-bus master arbiter Product data Sheet" released Oct. 23, 2014, 77 pages.

Open Source Multi-head 3D printer for polymer metal composite component manufacturing.

PCA954x I2C-bus multiplexer, Jul. 2008, NXP Semiconductors.

PCA9641 I2C arbiter, Oct. 2014, NXP Semiconductors.

(56) References Cited

OTHER PUBLICATIONS

Reddit, "Use an accelerometer to measure Z wobble", last retrieved on Jul. 1, 2019, https://www.reddit.com/r/Reprap/comments/6qsoyd/use_an_accelerometer_to_measure_7_wobble/, 3 pages.
The I2C-Bus Specification Version 2.1 Jan. 2000 (Year: 2000), 46 pages.

* cited by examiner

PRINT LIQUID SUPPLY UNITS

RELATED APPLICATIONS

This application is related to and claims priority to PCT International Application No. PCT/US2018/063643, filed Dec. 3, 2018, for "LOGIC CIRCUITRY," to PCT International Application No. PCT/US2019/026145, filed Apr. 5, 2019, for "LOGIC CIRCUITRY," to PCT International Application No. PCT/US2019/042466, filed Jul. 18, 2019, for "SEALED INTERCONNECTS," to PCT International Application No. PCT/US2019/042465, filed Jul. 18, 2019, for "PRINT LIQUID SUPPLY UNITS," and to PCT International Application No. PCT/US2019/042467, filed Jul. 18, 2019, for "SENSOR CIRCUITRY."

BACKGROUND

Some types of printing utilize liquid. For example, some types of printing extrude liquid onto media or material to produce a printed product (e.g., two-dimensional (2D) printed content, three-dimensional (3D) printed objects). In some examples, a print head may be utilized to extrude ink onto paper to print text and/or images. In some examples, a print head may be utilized to extrude fusing agent onto material in order to form a 3D printed object.

DETAILED DESCRIPTION

Figure 1:
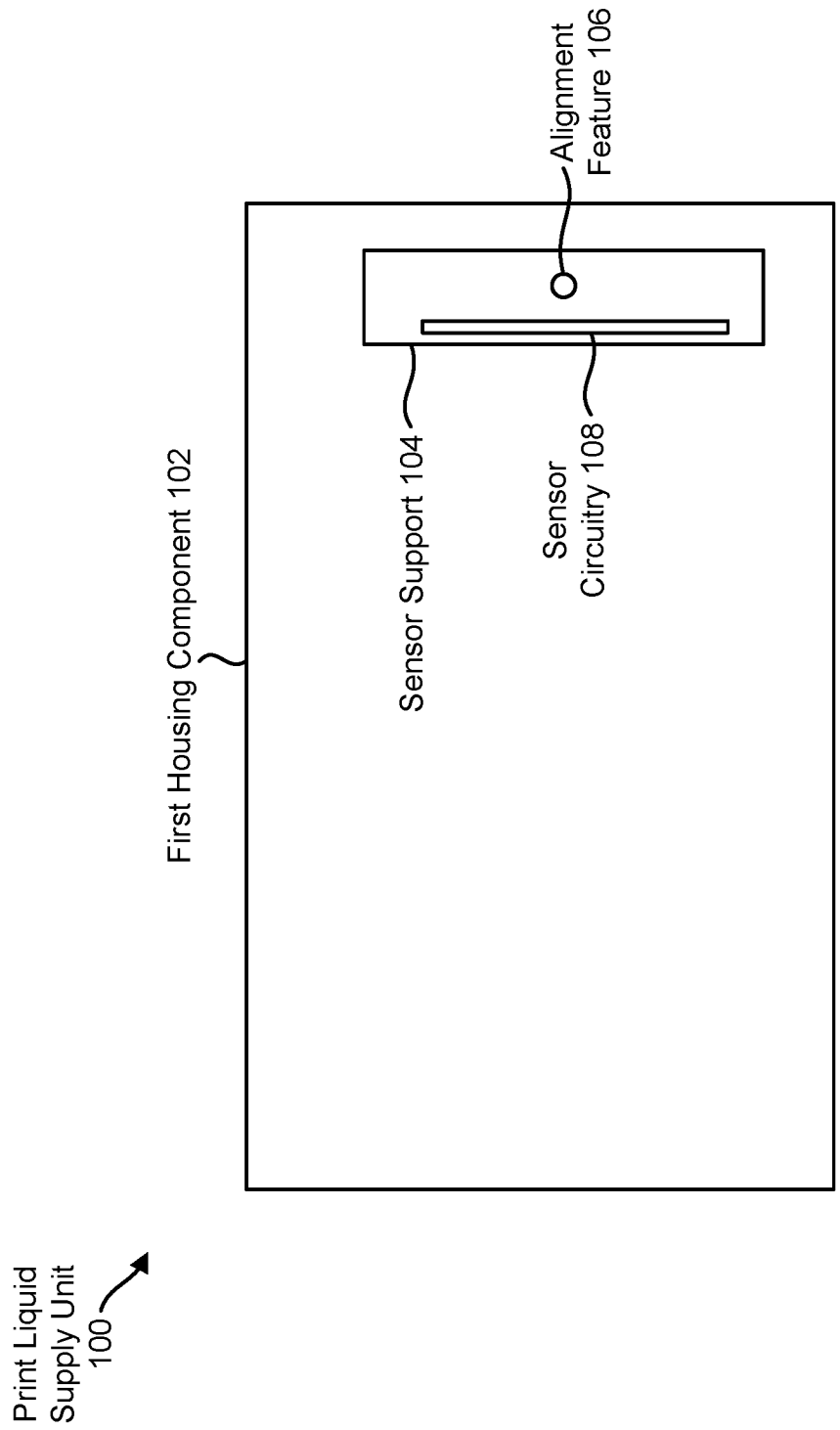
FIG. 1 is a diagram illustrating an example of a print liquid supply unit.

Some issues arise in the context of utilizing print liquid. Print liquid is a fluid for printing. Examples of print liquid include ink and fusing agent. In some examples, accurately sensing an amount of print liquid remaining in a reservoir may be difficult. An inaccurately sensed liquid level may lead to changing a print liquid supply unit more often, wasting print liquid, and/or increasing printing expense. Accordingly, it may be beneficial to provide more delivered print liquid, a more reliable sensed print liquid level, and/or less ink supply changes.

A sensor or sensors may be utilized to increase print liquid level sensing accuracy. The sensor(s) may be housed in a print liquid supply unit. A print liquid supply unit is a container that holds print liquid. In some examples, a print liquid supply unit may be referred to as a print liquid container, a cartridge, a supply, print liquid supply cartridge, etc. In some examples, the sensor(s) may be housed in a print liquid containing portion that may be referred to as a reservoir. In some examples, the sensor(s) may sense print liquid level and/or strain or pressure.

In some examples, four print liquid supply units may be utilized for a printer, which may include black, cyan, magenta, and yellow print liquid supplies. This may allow print liquid supplies with colors to be replaced individually. For example, a print liquid color that is used more often may be replaced individually without replacing remaining print liquid of another color or colors.

The print liquid may be supplied to a printer. For instance, the print liquid may be provided from the print liquid supply unit to a print head assembly. A print head assembly is a device that includes a print head to extrude the print liquid.

In some examples, print liquid supply units may be constructed of thermoplastics. Thermoplastics may be injection molded and may be compatible with high volume manufacturing and/or assembly methods. It may be beneficial for the construction materials (e.g., materials to construct components of the print liquid supply) to be compatible with the print liquid, to be robust to environmental conditions during shipping/handling, and/or to provide target water vapor transmission rates such that print quality is maintained over the life of the print liquid supply unit. In some examples, print liquid supply units may be constructed from thermoplastics such as polypropylene (PP), low-density polyethylene (LDPE), high-density polyethylene (HDPE), polyethylene terephthalate (PET), polycarbonate (PC), and/or blends thereof. Some thermoplastics may be compatible with high volume assembly methods such as ultrasonic welding, vibration welding, and/or laser welding. In some examples, welding (e.g., laser welding) may be capable of creating waterproof joint seals to contain the print liquid. As used herein, "welding," "weld," and variations thereof may denote laser welding, ultrasonic welding, and/or vibration welding. Examples of other approaches for joining components may include using adhesive.

Throughout the drawings, similar reference numbers may designate similar, but not necessarily identical, elements. Similar numbers may indicate similar elements. When an element is referred to without a reference number, this may refer to the element generally, without necessary limitation to any particular Figure. The figures are not necessarily to scale, and the size of some parts may be exaggerated to more clearly illustrate the example shown. Moreover the drawings provide examples and/or implementations in accordance with the description; however, the description is not limited to the examples and/or implementations provided in the drawings.

FIG. 1 is a diagram illustrating an example of a print liquid supply unit 100. Examples of the print liquid supply unit 100 include print liquid containers, cartridges, supplies, print liquid supply cartridges, ink supply units, etc. The print liquid supply unit 100 may contain and/or transfer print liquid (e.g., ink, agent, etc.). In some examples, the print liquid supply unit 100 may be designed to interface with a host device. A host device is a device that uses and/or applies print liquid. Examples of a host device include printers, ink jet printers, 3D printers, etc. For example, it may be beneficial to replenish or replace the print liquid supply unit 100 when some or all of the print liquid has been utilized.

In some examples, the print liquid supply unit 100 may include a regulator assembly (not shown in FIG. 1). A regulator assembly is a device to regulate pressure within the print liquid supply unit 100. The regulator assembly may include a component or components. For example, the regulator assembly may include a pressure chamber. The pressure chamber is a structure that is at least partially expandable and/or collapsible. For example, the pressure chamber may hold a gas (e.g., air) or fluid. In some examples, the pressure chamber may expand when inflated and/or may collapse when deflated. Examples of the pressure chamber and/or regulator assembly may include a bag or balloon. In some examples, the regulator assembly may include a spring and/or a lever. The spring and/or level may be utilized with the pressure chamber (e.g., bag or balloon) to regulate the pressure in the print liquid supply unit 100. Another example of the pressure chamber and/or regulator assembly is a film on a structure (e.g., rib structure(s)) of the print liquid supply unit 100.

In some examples, the print liquid supply unit 100 may include a port (not shown in FIG. 1). The port is an opening in the print liquid supply unit 100. An example of the port is a print liquid outlet. For example, the print liquid supply unit 100 may supply print liquid to a printer (e.g., print head) via the port.

In some examples, the print liquid supply unit 100 may include sensor circuitry 108. The sensor circuitry 108 is electronic circuitry to detect a condition or conditions. In some examples, the sensor circuitry 108 may include a liquid level sensor and/or a strain or pressure sensor. In some examples, the sensor circuitry 108 may be mounted on and/or in a sensor support 104. The sensor support 104 is a structure that supports (e.g., carries) the sensor circuitry 108. In some examples, the sensor support 104 may be a substrate or board. In some examples, the sensor support 104 may be molded from a glass-filled engineering plastic for stability and to withstand a curing temperature to attach and protect all the components on the sensor support 104 with adhesive. In some examples, the sensor circuitry 108 may be attached to the support with adhesive. The adhesive may be utilized for a portion of or a full length of the sensor circuitry 108. For example, adhesive may be applied to the sensor support 104. The sensor circuitry 108 may be placed on the adhesive, which may then be cured. In some examples, the sensor support 104 may include a slot or slots to attach the sensor support 104 and the sensor circuitry to the print liquid supply unit 100 (e.g., to a first housing component, to a lid, etc.).

In some examples, the sensor circuitry 108 may include a liquid level sensor or sensors (e.g., digital liquid level sensor(s)) and/or a strain or pressure sensor(s). In some examples, measurements from the sensor circuitry 108 may be utilized to determine a print liquid level. In some examples, the sensor circuitry 108 (e.g., liquid level sensor) may include an array of heaters and thermal sensors. For example, the sensor circuitry 108 may activate the array of heaters and measure temperature at different levels. Lesser temperatures may correspond to heaters and/or thermal sensors that are below the print liquid level. Greater temperatures may correspond to heaters and/or thermal sensors that are above the print liquid level. The measured temperatures may indicate the level of the print liquid due to the different specific heats of print liquid and air.

In some examples, a liquid level sensor may span a range of potential print liquid levels. For example, a liquid level sensor may extend from a bottom of a reservoir of the print liquid supply unit 100 to a top of the reservoir to detect a full range of print liquid levels. In some examples, the liquid level sensor may span a partial range of potential print liquid levels. For example, the sensor circuitry 108 may detect a print liquid level for a portion of a level range of the print liquid reservoir. For example, the sensor circuitry 108 may detect print liquid levels that are 50% or less. Other ranges may be implemented (e.g., 90% or less, 75% or less, 60% or less, 30% or less, 25% or less, etc.). In some examples, multiple techniques may be utilized to measure print liquid level. For example, drop counting may be utilized to measure a print liquid level between 50% and 100%, while the sensor circuitry 108 (e.g., liquid level sensor) may measure a print liquid level between 0% and 100%.

In some examples, the sensor circuitry 108 may include a strain sensor or pressure sensor. For example, the sensor circuitry 108 may include a strain gauge or strain gauges, piezoelectric pressure sensor(s), electromagnetic pressure sensor(s), and/or capacitive pressure sensor(s), etc. For instance, the strain sensor or pressure sensor may provide measurements that indicate a change in resistance, inductance, and/or capacitance that corresponds to a strain or pressure. In some examples, the strain sensor or pressure sensor may measure a structural strain (e.g., deflection deformation of a wall of the print liquid supply unit 100) of the print liquid supply unit 100 and/or pressure in the reservoir.

In some examples, the sensor circuitry 108 may include a combination of a print liquid level sensor and a strain or pressure sensor. Accordingly, the sensor circuitry 108 may provide measurements that indicate a print liquid level and a strain or pressure of the print liquid supply unit 100.

In some examples, the print liquid supply unit 100 may include a first housing component 102. A housing component is a structure of a print liquid supply unit for containing print liquid. In some examples, a housing component is a part of a print liquid supply unit. In some examples, the print liquid supply unit 100 may include the first housing component 102 and a second housing component. For example, the first housing component 102 may be joined to the second housing component to form the print liquid reservoir. In some examples, the first housing component 102 and the second housing component may be made of a thermoplastic or a combination of thermoplastics. In some examples, the first housing component 102 may be a lid of the print liquid supply unit 100 and the second housing component may be a body of the print liquid supply unit 100. In some examples, the first housing component 102 may be welded and/or joined to the second housing component along a supply joint. The supply joint is an interface between housing components. In some examples, the first housing component 102 may be welded and/or joined to the second housing component using laser welding, ultrasonic welding, vibration welding, and/or adhesive.

In some examples, the first housing component 102 may include an alignment feature 106. An alignment feature is a structure to align a sensor support 104 and/or sensor circuitry 108 to the first housing component 102. Examples of an alignment feature 106 include a protrusion, a post, a column, a tab, a clip, a recess, a groove, etc. In some examples, the sensor support 104 is secured to the first housing component 102 with the alignment feature 106. The alignment feature 106 may secure the sensor support 104 to the first housing component 102 by restricting the placement and/or motion of the sensor support 104 in a direction or directions relative to the first housing component 102. For example, the alignment feature 106 may restrict the placement and/or motion of the sensor support 104 in a vertical direction, a horizontal direction, and/or a depth direction relative to the first housing component 102.

In some examples, the alignment feature 106 may be situated through a slot in the sensor support 104. For example, the sensor support 104 may include a slot or slots through which the alignment feature 106 may be situated. A slot is an opening or gap.

In some examples, the alignment feature 106 may include a snap-fit feature to secure the sensor support 104 to the first housing component 102. A snap-fit feature is a structure that restricts placement and/or motion of the sensor support 104 when the sensor support is installed on the alignment feature. For example, the alignment feature 106 may include a post with a snap-fit feature that enlarges a portion of the alignment feature 106. The snap-fit feature (e.g., the enlarged portion of the alignment feature 106) may be larger than a slot of the sensor support 104, which may allow the sensor support 104 to be pressed over the snap-fit feature. For instance, the snap-fit feature may be an annular bulge of a portion of the alignment feature 106. During installation, the sensor support 104 (e.g., slot) may be pressed over the snap-fit feature. The snap-fit feature (e.g., annular bulge) may secure the sensor support 104 to the first housing component 102.

In some examples, the print liquid supply unit 100 may include a second housing component (e.g., body). In some examples, the second housing component may include an interference component that maintains the sensor support 104 on the alignment feature 106. The interference component is a structure that maintains the placement of the sensor support with contact and/or pressure. For example, the second housing component (e.g., body) may include a structure, protrusion, surface, etc., that contacts the sensor support 104 and/or presses on the sensor support 104, when the second housing component is joined with the first housing component. The interference component may maintain the placement of the sensor support 104 on the alignment feature 106 by preventing the sensor support 104 from removal from the alignment feature 106.

In some examples, the print liquid supply unit 100 (e.g., the first housing component 102) may include multiple alignment features. For example, the print liquid supply unit 100 (e.g., the first housing component 102) may include multiple (e.g., two, three, four, etc.) structures, protrusions, posts, recesses, etc., to maintain the placement of the sensor support 104 and/or sensor circuitry 108 relative to the print liquid supply unit (e.g., the first housing component 102).

In some examples, the sensor circuitry 108 may be coupled to a conductor or conductors. A conductor is a material that is able to conduct electricity or electrical signals. For example, a conductor may be a metal wire or ribbon. In some examples, a conductor may be overmolded with a protective material. The protective material may protect the conductor from contact with the print liquid, which may degrade the conductor. The conductor(s) may be routed from the inside of the print liquid supply unit 100 to the outside of the print liquid supply unit 100 through the supply joint or a wall of the print liquid supply unit 100. In some examples, the conductor may be coupled to an electrical interface (e.g., electrical connection pad(s)) on the outside of the print liquid supply unit 100. The electrical interface may be utilized to communicate with a printer in some examples.

Figure 2A:
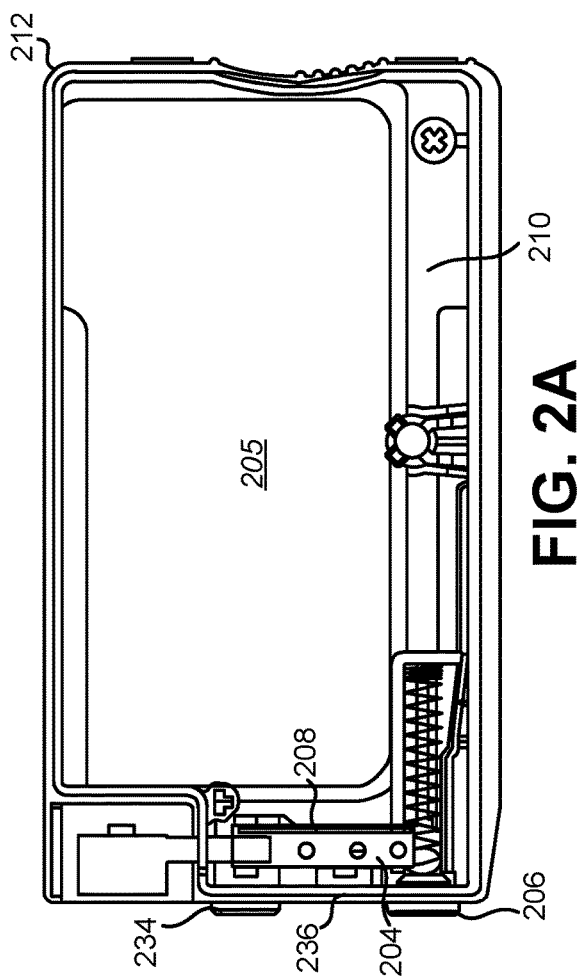
FIG. 2A is a diagram illustrating an example of a body of a print liquid supply unit.

FIG. 2A is a diagram illustrating an example of a body 212 of a print liquid supply unit. The body 212 may be an example of the second housing component described in connection with FIG. 1.

Figure 2B:
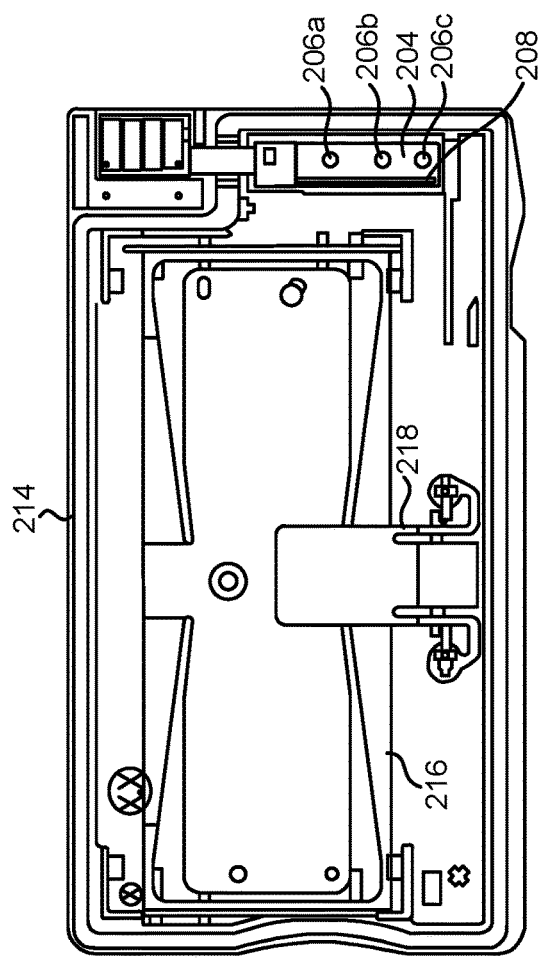
FIG. 2B is a diagram illustrating an example of a lid of a print liquid supply unit.

FIG. 2B is a diagram illustrating an example of a lid 214 of a print liquid supply unit. The lid 214 may be an example of the first housing component 102 described in connection with FIG. 1. FIGS. 2A and 2B will be described together.

In some examples, the body 212 and the lid 214 may be joined to form a print liquid supply unit (e.g., a print liquid container, a cartridge, print liquid supply cartridge, etc.). A reservoir 210 for print liquid may be enclosed when the body 212 and the lid 214 are joined. FIGS. 2A-B Illustrate examples of some components that may be internally housed in the print liquid supply unit.

In this example, a regulator assembly of the print liquid supply unit may include a pressure chamber 205 (e.g., a bag), a spring plate 216, and a lever 218. The regulator assembly may provide backpressure to the print liquid supply unit. In FIG. 2A, the pressure chamber 205 is illustrated inside the body 212, where some edges of the pressure chamber 205 (e.g., bag) may be folded along some edges of the body 212. Different shapes may be utilized for a pressure chamber, and/or a pressure chamber may change shape during operation. For example, the pressure chamber 205 may be shaped as an oblong oval in a stage of operation. In some examples, the spring plate 216 and/or lever 218 may be mounted to the lid 214. In some examples, the sensor circuitry 208 and/or sensor support 204 may be mounted to the lid 214. Other types of regulator assemblies may be utilized in some examples. For instance, other mechanical regulator assemblies and/or capillary media assemblies may be utilized with a reservoir 210 for the sensor circuitry 208. For example, the regulator assembly may be replaced with a block of foam in a similar position to work in a reservoir or ink chamber (with the sensor circuitry 208, for instance).

In some examples, the print liquid supply unit (e.g., the body 212) may include a port 206, a fill port 236, and/or an air interface port 234. The fill port 236 is a port for filling the print liquid supply unit with print liquid. The air interface port 234 is a port for inflating and/or deflating the pressure chamber 205. The port 206 may be utilized to supply print liquid. In the example illustrated in FIG. 2A, a rubber septum, a ball, and a spring are utilized to control port 206 access. In other examples, a port may include and/or utilize a split septum, or a film. In FIG. 2A, the sensor circuitry 208 and sensor support 204 are illustrated as being superimposed on the body 212 for clarity.

In some examples, the print liquid supply unit is filled through the fill port 236. A plug (e.g., plastic ball cork) may be utilized to close (e.g., seal) the fill port 236. Some (e.g., most) of the air remaining in the print liquid supply unit after filling with print liquid may be removed via the port 206. As the air is removed, an internal vacuum may be created that inflates the pressure chamber 205 (e.g., bag) while being resisted by the spring plate 216. The volume in the pressure chamber 205 may be sized to regulate (e.g., maintain) a pressure in a target range inside the print liquid supply unit during variations in temperature and/or altitude, and/or to prevent internal over-pressurization.

In some examples, when the print liquid supply unit is installed in a print head assembly, a first male needle interfaces with the port 206 and a second male needle interfaces with an air interface port 234. As print liquid is used and removed from the print liquid supply unit through the port 206, the pressure chamber 205 inflates and pushes on the lever 218 in the lid 214, which may open a port to allow air to bubble into the print liquid supply unit. The pressure chamber 205 may deflate accordingly to regulate the pressure in the print liquid supply unit. When the print liquid is exhausted from the print liquid supply unit (e.g., when most or all of the print liquid has been expelled), some air may be passed through the port 206 (e.g., through the first male needle) into the print head assembly.

In some examples, when a new print liquid supply unit is installed or when the print head is to be purged for servicing, an air pump in the printer may be used to inflate (e.g., hyper-inflate) the pressure chamber 205 through the air interface port 234. When the pressure chamber 205 is inflated to a degree, the lid 214 and/or the body 212 may deflect (e.g., bulge). For example, a wall of the lid 214 and/or a wall of the body 212 may deflect. In some examples, the pressure chamber 205 may be inflated to occupy more volume inside the print liquid supply, which may cause deflection. Inflating the pressure chamber 205 for a newly installed print liquid supply unit may force print liquid into the print head assembly to prime the print head while air is pushed into the print liquid supply unit.

In some examples, sensor circuitry may be attached to the print liquid supply unit. In the example illustrated in FIG. 2A and FIG. 2B, the sensor circuitry 208 and sensor support 204 are attached to the lid 214. For example, the sensor support 204 may be attached to the lid 214 with three alignment features 206a-c as illustrated in FIG. 2B. Other techniques may be utilized to secure the sensor support 204 to the lid 214. In some examples, a fastener or fasteners may be utilized to secure the sensor support 204 to the lid 214. In some examples, the sensor support 204 may be welded to the lid 214. In some examples, the alignment features 206a-c may be omitted.

When a deflection (e.g., bulge) occurs, the sensor circuitry 208 (e.g., strain gauge) may detect the deflection. For example, the sensor circuitry 208 may produce measurements that indicate the deflection. The measurements may be communicated to a printer in some examples. For example, strain and/or pressure sensors may be utilized to provide feedback. For instance, the sensor circuitry 208 may be utilized to verify that a regulator assembly and/or pressure chamber are functioning. In some examples, the sensor circuitry 208 may be utilized to determine if there is a leak in the print liquid supply unit.

In some examples, sensor circuitry may include layers of sensors. For example, sensor circuitry may be manufactured using layers of silicon. In some examples, strain gauges may be located in a lower (e.g., bottom) layer, heaters may be located in a middle layer (e.g., a layer above the layer with the strain gauges), and thermal sensors may be located on an upper layer (e.g., on the face of the silicon). When the heaters are activated, the thermal sensors may detect the difference between the presence of air and print liquid, which may indicate the print liquid level.

In some examples, sensor circuitry (e.g., the sensing face of the silicon) may be coated with a protective layer to prevent the sensor circuitry from becoming etched over time from being exposed to the print liquid. In some examples, the protective layer may be fragile. Accordingly, it may be beneficial to avoid contact between sensor circuitry and an internal component or components, such as a pressure chamber.

In some examples, the sensor support 204 (e.g., substrate) and/or connections may extend along port features, while the sensor circuitry 208 may extend next to the port features. In some examples, the sensor circuitry 208 may detect a print liquid level for a portion of a level range of the reservoir 210. For instance, the sensor circuitry 208 may provide sensing for a level range that is approximately half of a maximum print liquid level and/or approximately half of the height of the reservoir 210.

Figure 3B:
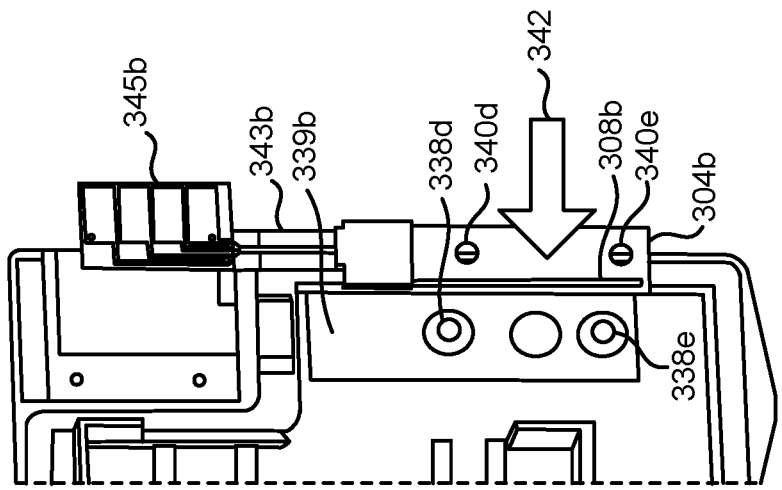
FIG. 3B is a diagram illustrating a perspective view of an example of a portion of a print liquid supply unit.
Figure 3A:
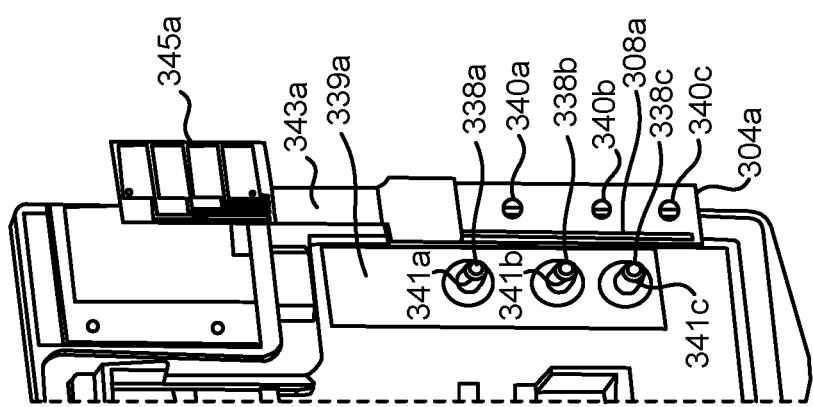
FIG. 3A is a diagram illustrating a perspective view of an example of a portion of a print liquid supply unit.

FIG. 3A is a diagram illustrating a perspective view of an example of a portion of a print liquid supply unit. The portion may be an example of a portion of the first housing component 102 (e.g., a lid) described in connection with FIG. 1. The print liquid supply unit (e.g., an interior side of a first housing component or lid) may include a recess 339a, posts 338a-c, and/or snap-fit features 341a-c. FIG. 3A also illustrates sensor circuitry 308a on the sensor support 304a, an electrical connector 343a, and electrical pads 345a. The posts 338a-c may be examples of the alignment feature 106 described in connection with FIG. 1. For example, the posts 338a-c are protruding structures or columns for aligning and/or securing the sensor support 304a to the print liquid supply unit (e.g., first housing component or lid). The snap-fit features 341a-c may be enlarged portions of the posts 338a-c. A sensor support 304a may include slots 340a-c. The posts 338a-c may be situated through the slots 340a-c. For example, the sensor support 304a may be pressed onto the posts 338a-c such that the snap-fit features 341a-c deflect to allow the posts 338a-c to be situated through the slots 340a-c. The snap-fit features 341a-c may secure (e.g., retain) the sensor support 304a when the snap-fit features 341a-c have passed through the slots 340a-c. In some examples, raised surfaces may be included at the bases of the posts 338a-c in the recess 339a. The recess 339a is a recessed area (e.g., an area in a raised fence or raised fences on a side or sides) in the inside of the print liquid supply unit (e.g., of a first housing component or lid). The raised surfaces may protrude from the recess 339a to allow more deflection of the print liquid supply unit. Utilizing the raised surfaces may reduce an amount of overall surface area to be controlled for flatness. The recess 339a and the raised areas may facilitate print liquid drainage between the back of the sensor support 304a and the print liquid supply unit (e.g., first housing component or lid). In the example of FIG. 3A, the print liquid supply unit includes three posts 338a-c. Different numbers of raised surfaces and/or posts may be utilized. While round posts are shown in some of the Figures, posts of other shapes may be utilized in some examples.

In some examples, 1-x number of snap-fit features and/or posts may be included in the first housing component (e.g., lid). In the example of FIG. 3A, three posts 338a-c may be utilized to align and/or secure the sensor support 304a to the first housing component (e.g., lid). In some examples, alignment features and/or snap-fit features may be utilized to secure a sensor support without heat (e.g., swaging).

FIG. 3B is a diagram illustrating a perspective view of an example of a portion of a print liquid supply unit. The portion may be an example of a portion of the first housing component 102 (e.g., a lid) described in connection with FIG. 1. The print liquid supply unit (e.g., an interior side of a first housing component or lid) may include a recess 339b and/or posts 338d-e. FIG. 3B also illustrates sensor circuitry 308b on the sensor support 304b, an electrical connector 343b, and electrical pads 345b. The posts 338d-e may be examples of the alignment feature 106 described in connection with FIG. 1. For example, the posts 338d-e are protruding structures or columns for aligning and/or securing the sensor support 304b to the print liquid supply unit (e.g., first housing component or lid). A sensor support 304a may include slots 340d-e. The posts 338d-e may be situated through the slots 340*d-e*. For example, the sensor support 304*a* may slide onto the posts 338*d-e*.

A second housing component (e.g., a body) may include an interference component. In FIG. 3B, the interference component is represented with an arrow 342. The interference component may maintain the sensor support 304*b* on the posts 338*d-e*. In some examples, raised surfaces may be included in the recess 339*b* (e.g., at the bases of the posts 338*d-e* and/or in another location or locations). The recess 339*b* is a recessed area (e.g., an area in a raised fence or raised fences on a side or sides) in the inside of the print liquid supply unit (e.g., of a first housing component or lid). The raised surfaces may protrude from the recess 339*b* to allow more deflection of the print liquid supply unit. In some examples, the interference component may contact the sensor support 304*b*, such that the sensor support 304*b* is maintained (e.g., trapped) between the raised surface(s) and the interference component. Utilizing the raised surfaces may reduce an amount of overall surface area to be controlled for flatness. The recess 339*b* and the raised areas may facilitate print liquid drainage between the back of the sensor support 304*a* and the print liquid supply unit (e.g., first housing component or lid). In the example of FIG. 3B, the print liquid supply unit includes two posts 338*d-e*. Different numbers of raised surfaces and/or posts may be utilized. While round posts are shown in some of the Figures, posts of other shapes may be utilized in some examples.

In some examples, 1-x number of posts may be included in the first housing component (e.g., lid). In the example of FIG. 3B, two posts 338*d-e* may be utilized to align and/or secure the sensor support 304*a* to the first housing component (e.g., lid) in two dimensions (e.g., horizontal and vertical dimensions). The sensor support 304*b* may be retained along a third dimension (e.g., a depth dimension) by 1-x number of interference components (represented by the arrow 342 in FIG. 3B) on the second housing component that pinch the sensor support 304*b* between the first housing component (e.g., lid) and the second housing component (e.g., body). In some examples, alignment feature(s) and/or interference component(s) may be utilized to secure a sensor support without deflecting structures (e.g., snap-fit features) and/or without heat (e.g., swaging and/or curing).

Figure 4B:
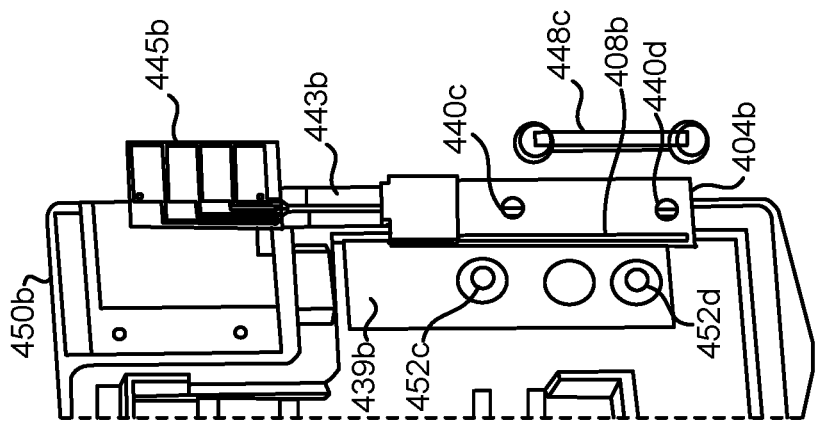
FIG. 4B is a diagram illustrating a perspective view of an example of a portion of a print liquid container.
Figure 4A:
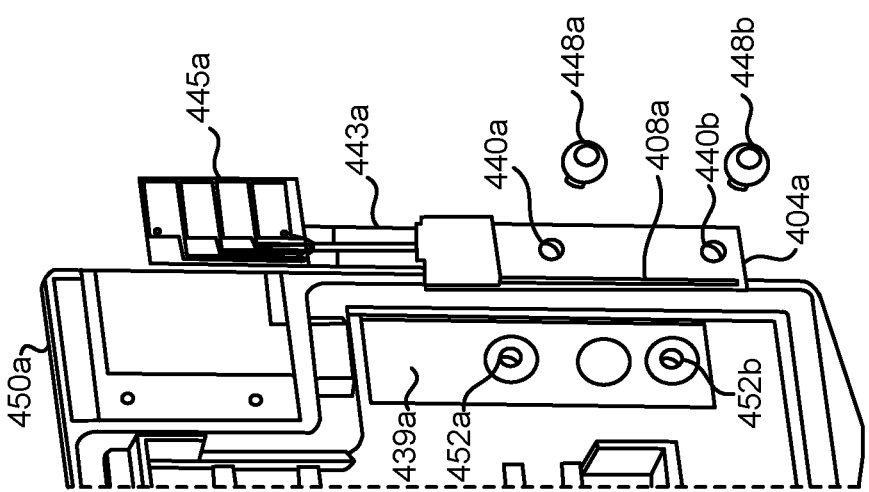
FIG. 4A is a diagram illustrating a perspective view of an example of a portion of a print liquid container.

FIG. 4A is a diagram illustrating a perspective view of an example of a portion of a print liquid container. The portion may be an example of a portion of a first housing component (e.g., a lid 450*a*) of a print liquid container. The print liquid container may include some aspects similar to those of the print liquid supply units described in connection with FIG. 1 and/or FIG. 2. In the example described in connection with FIG. 4A, fasteners 448*a-b* may be utilized to fasten the sensor support 404*a* to the lid 450*a* of the print liquid container. For example, a fastener or fasteners may be utilized to fasten a sensor support to a first housing component (e.g., lid) instead of an alignment feature or alignment features described in connection with FIG. 1 and/or FIG. 2. The print liquid container (e.g., an interior side of the lid 450*a*) may include a recess 439*a* and/or fastener receivers 452*a-b*. A fastener receiver is a structure for receiving a fastener. Examples of fastener receivers may include recesses, gaps, slots, holes, etc. A fastener receiver may be complementary to a fastener. FIG. 4A also illustrates a container property sensor 408*a* on a sensor support 404*a*, an electrical connector 443*a*, and electrical pads 445*a*. The container property sensor 408*a* may be an example of the sensor circuitry described in connection with FIG. 1 and/or FIG. 2. A container property sensor may include a sensor or sensors for sensing a property or properties (e.g., temperature and/or strain or pressure) of a print liquid container. The container property sensor 408*a* may be attached to the sensor support 404*a*.

In some examples, a print liquid container may include a fastener or fasteners. Examples of fasteners include screws, nails, staples, etc. In the example of FIG. 4A, the print liquid container (e.g., lid 450*a*) includes two fasteners 448*a-b*. For instance, the fasteners 448*a-b* are screws. A sensor support 404*a* may include slots 440*a-b*. The fasteners 448*a-b* may be situated through the slots 440*a-b*. For example, the fasteners 448*a-b* may be situated through the slots 440*a-b* and attached to the fastener receivers 452*a-b*. For example, the fasteners 448*a-b* may be rotated to interface with and/or to be secured to the fastener receivers 452*a-b*.

In some examples, raised surfaces may be included in the recess 439*a* (e.g., with the fastener receivers 452*a-b* and/or in another location or locations). The recess 439*a* is a recessed area (e.g., an area in a raised fence or raised fences on a side or sides) in the inside of the print liquid container (e.g., lid 450*a*). The raised surfaces may protrude from the recess 439*a* to allow more deflection of the print liquid container. In some examples, portions of the fasteners 448*a-b* (e.g., fastener heads, screw heads, etc.) may contact the sensor support 404*a*, such that the sensor support 404*a* is maintained (e.g., trapped) between the raised surface(s) and the fastener portions. Utilizing the raised surfaces may reduce an amount of overall surface area to be controlled for flatness. The recess 439*a* and the raised areas may facilitate print liquid drainage between the back of the sensor support 404*a* and the print liquid container (e.g., lid 450*a*). In the example of FIG. 4A, the print liquid container includes two fastener receivers 452*a-b*. Different numbers of fastener receivers and/or fasteners may be utilized. While screws are shown in FIG. 4A, different kinds of fasteners may be utilized in some examples.

In some examples, 1-x number of fasteners and/or fastener receivers may be utilized to fasten a sensor support to a print liquid container lid. In the example of FIG. 4A, two fasteners 448*a-b* and fastener receivers 452*a-b* may be utilized to fasten the sensor support 404*a* to the lid 450*a* in three dimensions (e.g., horizontal, vertical, and depth dimensions). In some examples, fastener(s) may be utilized to fasten a sensor support without heat.

FIG. 4B is a diagram illustrating a perspective view of an example of a portion of a print liquid container. The portion may be an example of a portion of a first housing component (e.g., a lid 450*b*) of a print liquid container. The print liquid container may include some aspects similar to those of the print liquid supply units described in connection with FIG. 1 and/or FIG. 2. In the example described in connection with FIG. 4B, a retainer 448*c* may be utilized to fasten the sensor support 404*b* to the lid 450*b* of the print liquid container. A retainer is an example of a fastener. In some examples, a retainer or retainers may be welded to a lid to fasten a sensor support to the lid. For example, a retainer or retainers may be utilized to fasten a sensor support to a first housing component (e.g., lid) instead of an alignment feature or alignment features described in connection with FIG. 1 and/or FIG. 2. The print liquid container (e.g., an interior side of the lid 450*b*) may include a recess 439*b* and/or fastener receivers 452*c-d*. The fastener receivers 452*c-d* may receive the retainer 448*c*. FIG. 4B also illustrates a container property sensor 408*b* on a sensor support 404*b*, an electrical connector 443*b*, and electrical pads 445*b*. The container property sensor 408*b* may be an example of the sensor circuitry described in connection with FIG. 1 and/or FIG. 2. The container property sensor 408b may be attached to the sensor support 404b.

In some examples, a print liquid container may include a retainer or retainers. A retainer is a structure to retain a sensor support. In the example of FIG. 4B, the print liquid container (e.g., lid 450b) includes a retainer 448c. For instance, the retainer 448c is a structure that may be attached to the lid 450b that retains the sensor support 404b. A sensor support 404b may include slots 440c-d. The retainer 448c may be situated through the slots 440c-d. For example, the retainer 448c may be situated through the slots 440c-d and attached to the fastener receivers 452c-d. For example, the retainer 448c may be welded to interface with and/or to be secured to the fastener receivers 452c-d.

In some examples, raised surfaces may be included in the recess 439b (e.g., with the fastener receivers 452c-d and/or in another location or locations). The recess 439b is a recessed area (e.g., an area in a raised fence or raised fences on a side or sides) in the inside of the print liquid container (e.g., lid 450b). The raised surfaces may protrude from the recess 439b to allow more deflection of the print liquid container. In some examples, a portion of the retainer 448c (e.g., brace, structure, etc.) may contact the sensor support 404b, such that the sensor support 404b is maintained (e.g., trapped) between the raised surface(s) and the retainer portion. Utilizing the raised surfaces may reduce an amount of overall surface area to be controlled for flatness. The recess 439b and the raised areas may facilitate print liquid drainage between the back of the sensor support 404b and the print liquid container (e.g., lid 450b). In the example of FIG. 4B, the print liquid container includes two fastener receivers 452c-d. Different numbers of fastener receivers and/or retainers may be utilized. While an example of a retainer structure is shown in FIG. 4B, different retainer structures may be utilized in some examples.

In some examples, 1-x number of retainers and/or fastener receivers may be utilized to fasten a sensor support to a print liquid container lid. For example, a retainer or retainers may be welded to a lid using laser welding or ultrasonic welding to indirectly attach a sensor support to the lid. In the example of FIG. 4B, two male protrusions or posts of the retainer 448c may be inserted through the slots 440c-d into the fastener receivers 452c-d to fasten the sensor support 404b to the lid 450b in two dimensions (e.g., horizontal and vertical dimensions). In some examples of ultrasonic welding, pressure may be applied between the lid 450b and the retainer 448c using an ultrasonic horn, and the retainer 448c and/or fastener receivers 452c-d may melt together while collapsing, which may pinch the sensor support 404b to retain the sensor support in a third dimension (e.g., depth dimension). In some examples of laser welding, pressure may be applied between the retainer 448c and the lid 450b (e.g., fastener receivers 452c-c) and a focused laser beam may pass through one component that is transparent to the laser (e.g., the lid 450b or the retainer 448c) and into the other component that absorbs energy from the laser. The components may melt together while collapsing, which may pinch the sensor support to retain the sensor support in a third dimension (e.g., depth dimension).

Figure 4D:
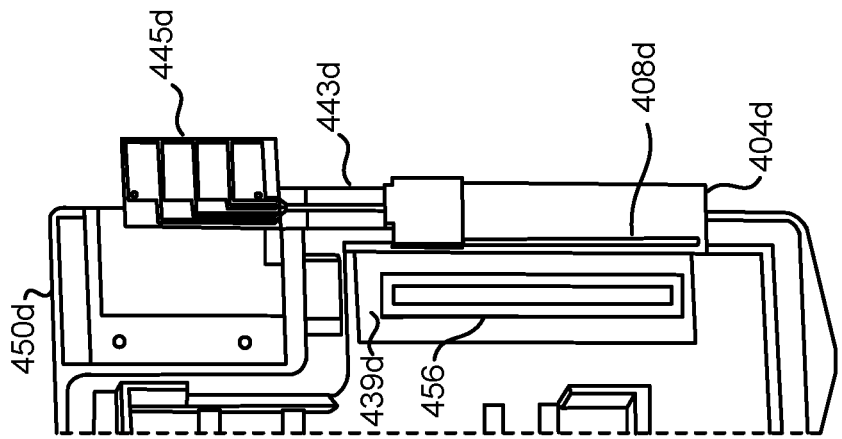
FIG. 4D is a diagram illustrating a perspective view of an example of a portion of an ink supply unit.
Figure 4C:
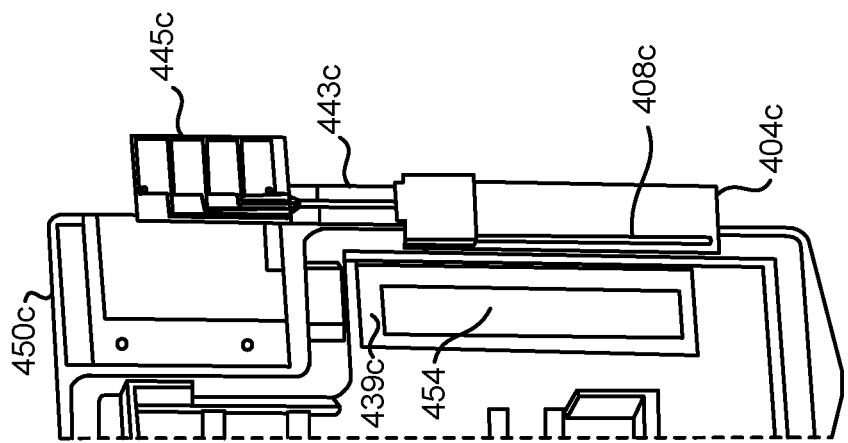
FIG. 4C is a diagram illustrating a perspective view of an example of a portion of a print liquid container.

FIG. 4C is a diagram illustrating a perspective view of an example of a portion of a print liquid container. The portion may be an example of a portion of a first housing component (e.g., a lid 450c) of a print liquid container. The print liquid container may include some aspects similar to those of the print liquid supply units described in connection with FIG. 1 and/or FIG. 2. In the example described in connection with FIG. 4C, an adhesive 454 may be utilized to fasten the sensor support 404c to the lid 450c of the print liquid container. Adhesive is an example of a fastener. For instance, the fastener may be adhesive, pressure sensitive adhesive (PSA), double-sided PSA, etc. The adhesive 454 may be cured with or without heat and/or light (e.g., ultraviolet light). In the example of FIG. 4C, the print liquid container (e.g., lid 450c) includes the adhesive 454. For instance, the adhesive 454 is a substance that may adhere to the lid 450c and/or to the sensor support 404c. For example, an adhesive may be utilized to fasten a sensor support to a first housing component (e.g., lid) instead of an alignment feature or alignment features described in connection with FIG. 1 and/or FIG. 2. The print liquid container (e.g., an interior side of the lid 450c) may include a recess 439c and/or the adhesive 454. FIG. 4C also illustrates a container property sensor 408c on a sensor support 404c, an electrical connector 443c, and electrical pads 445c. The container property sensor 408c may be an example of the sensor circuitry described in connection with FIG. 1 and/or FIG. 2. The container property sensor 408c may be attached to the sensor support 404c.

In the example of FIG. 4C, adhesive and/or PSA with or without a heat cure may be utilized to fasten and/or attach the sensor support 404c to the lid 450c. For example, adhesive 454 (e.g., double-sided PSA) may be applied to the lid 450c, to the sensor support 404c, or both. The sensor support 404c may be placed on the lid 450c. In some examples, pressure may be applied between the sensor support 404c and the lid 450c, and heat may or may not be utilized to cure the adhesive 454.

FIG. 4D is a diagram illustrating a perspective view of an example of a portion of an ink supply unit. The portion may be an example of a portion of a first housing component (e.g., a lid 450d) of an ink supply unit. The ink supply unit may include some aspects similar to those of the print liquid supply units described in connection with FIG. 1 and/or FIG. 2. In some examples, the ink supply unit may include a carrier 404d. The carrier may be an example of the sensor support(s) described in connection with FIG. 1 and/or FIG. 2. A digital ink level sensor 408d and/or strain or pressure sensor may be supported by the carrier 404d. The carrier 404d may be welded to the lid 450d. In the example described in connection with FIG. 4D, an energy director 456 may be utilized to weld the carrier 404d to the lid 450d of the ink supply unit. For example, the carrier 404d may be welded to the lid 450d with laser welding. In some examples, the lid 450d may include a laser transmissive component and a laser absorbing component. For example, a wall of the lid 450d or a portion thereof may be a laser transmissive component and the energy director 456 may be a laser absorbing component. In some examples, the carrier 404d may be welded to the lid 450d with ultrasonic welding or vibration welding. For example, welding may be utilized to attach a sensor support to a first housing component (e.g., lid) instead of an alignment feature or alignment features described in connection with FIG. 1 and/or FIG. 2. The ink supply unit (e.g., an interior side of the lid 450d) may include a recess 439d and/or the energy director 456. FIG. 4D also illustrates a digital ink level sensor 408d on a carrier 404d, an electrical connector 443d, and electrical pads 445d. The digital ink level sensor 408d may be an example of the sensor circuitry described in connection with FIG. 1 and/or FIG. 2. The digital ink level sensor 408d may be attached to the carrier 404d.

In some examples, laser welding or ultrasonic welding may be utilized to directly attach a carrier to the lid. In the example illustrated in FIG. 4D, an energy director 456 is shown on the lid. In some examples of ultrasonic welding, pressure may be applied between the lid 450d and the carrier 404d using an ultrasonic horn, and the energy director 456 may melt while collapsing, which may attach the carrier 404d to the lid 450d. In some examples of laser welding, pressure may be applied between the lid 450d and the carrier 404d and a focused laser beam may pass through one component that is transparent to the laser (e.g., the carrier 404d) and into the other component (e.g., energy director 456) that absorbs energy from the laser. The components may melt together while collapsing, which may attach the carrier 404d to the lid 450d.

Figure 6:
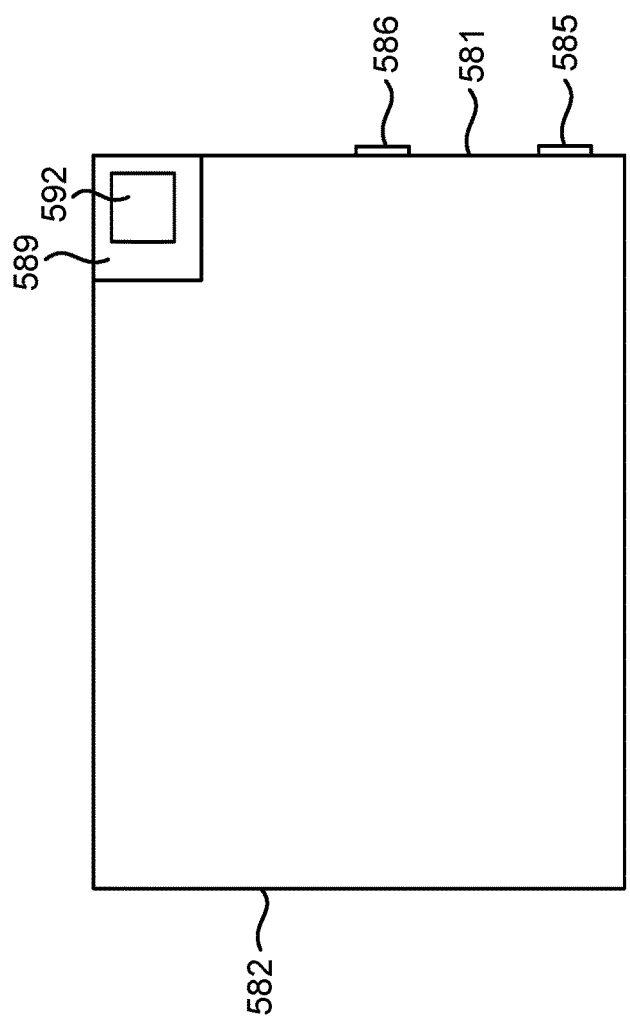
FIG. 6 is a cross-sectional view of the example print liquid supply cartridge of FIG. 5.
Figure 5:
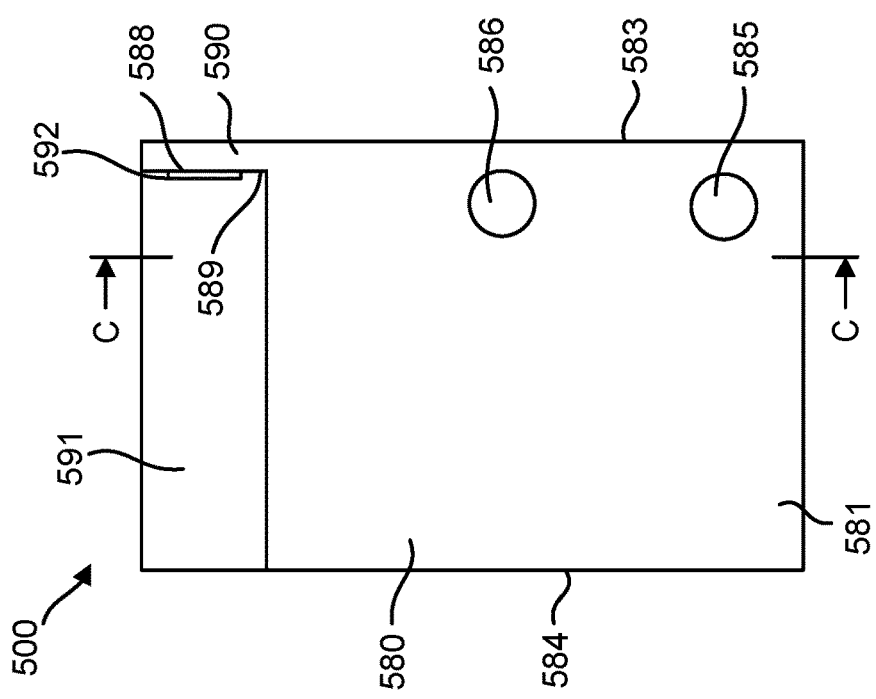
FIG. 5 shows an example print liquid supply cartridge.

FIG. 5 shows an example print liquid supply cartridge 500. In some examples, the print liquid supply cartridge 500 may be an example of the print liquid supply unit 100 described in connection with FIG. 1, an example of the print liquid container(s) described herein, an example of the ink supply unit(s) described herein, and/or an example of the cartridge(s) described herein. In some examples, a component or components (e.g., body, lid) described herein may be implemented with the print liquid supply cartridge 500. More particularly, FIG. 5 shows an elevation view of the example cartridge 500. The cartridge 500 has a housing 580 which encloses an internal volume in which the print liquid, such as ink or agent, can be stored. The internal volume of the example cartridges described herein may be between approximately 10 milliliters to approximately 50 or approximately 100 milliliters. The housing 580 has a front end 581, a rear end 582, and first and second sides 583, 584 extending from the front end to the rear end. The front end 581 and the rear end 582 can be seen also in FIG. 6, which is a cross-sectional view through the line C-C of the example print liquid supply cartridge of FIG. 5. The housing 580 may comprise two relatively hard plastic shells which directly contain the print liquid therebetween. In the example, the height of the housing is greater than the width of the housing. Similarly, the height of the internal volume is greater than the width of the internal volume. The height of the internal volume may be defined by the height of the first and second sides and the width of the internal volume may be defined by the distance between the first and second sides.

The front end 581 may have a print liquid outlet 585 through which the print liquid can be supplied to a printer, for example by insertion of a fluid pen of the printer therein. The print liquid outlet 585 may be provided closer to the bottom than to the top of the front end 581.

A gas inlet 586 may be provided on the front end 581 also, to enable gas such as air to be supplied to the cartridge, for example by insertion of a fluid pen of the printer therein. The gas inlet 586 may be positioned above the print liquid outlet 585.

A first wall 588 having an internal side 589 and an external side 590 may be provided to delimit a recess 591. In the example shown, the recess 591 extends from the first wall 588 across the entire width of the front end 581. The first wall 588 thus overhangs a notched corner of the housing. The external side 590 of the first wall 588 may be part of the first side 583 of the housing 580. Electrical connection pads 592 are exposed on the internal side of the first wall, as shown also in FIG. 6. The electrical connection pads 592 are indicated by a single block in FIGS. 5 and 6. In one example, there are three electrical connection pads, although fewer or more connection pads may be provided. The electrical connection pads may be arranged in a top to bottom direction. The electrical connection pads enable electrical signals to be communicated between electrical circuitry of the cartridge and electrical circuitry of the printer, for example in accordance with an inter-integrated circuit (I2C) data communication protocol. Hence, the connection pads may form an I2C data interface. Providing the electrical connection pads 592 to the first wall 588 allows for easy mounting of the electrical connection pads 592 on the cartridge. Being positioned on the internal side 589, the electrical connection pads 592 are protected from damage when shipping and handling the cartridge. The recess 591 can receive an electrical connector of a printer to establish an electrical connection between the electrical connection pads 592 and the electrical connector.

Figure 7:
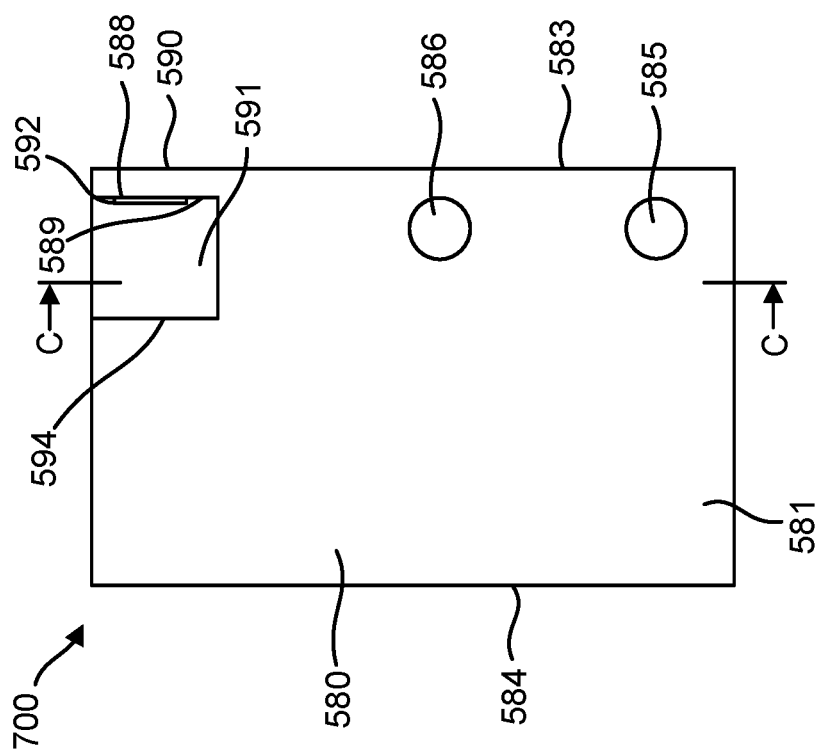
FIG. 7 shows another example print liquid supply cartridge.

FIG. 7 shows another example print liquid supply cartridge 700. In particular, FIG. 7 shows a plan view of the cartridge 700. The example cartridge of FIG. 7 is similar to that of FIG. 5. In the example of FIG. 7, the recess 591 does not extend across the entire width of the front end 581. The recess 591 is delimited by a second wall 594. The recess 591 between the first wall 588 and the second wall 594 may receive an electrical connector of a printer therein to contact the electrical connection pads 592.

Figure 8:
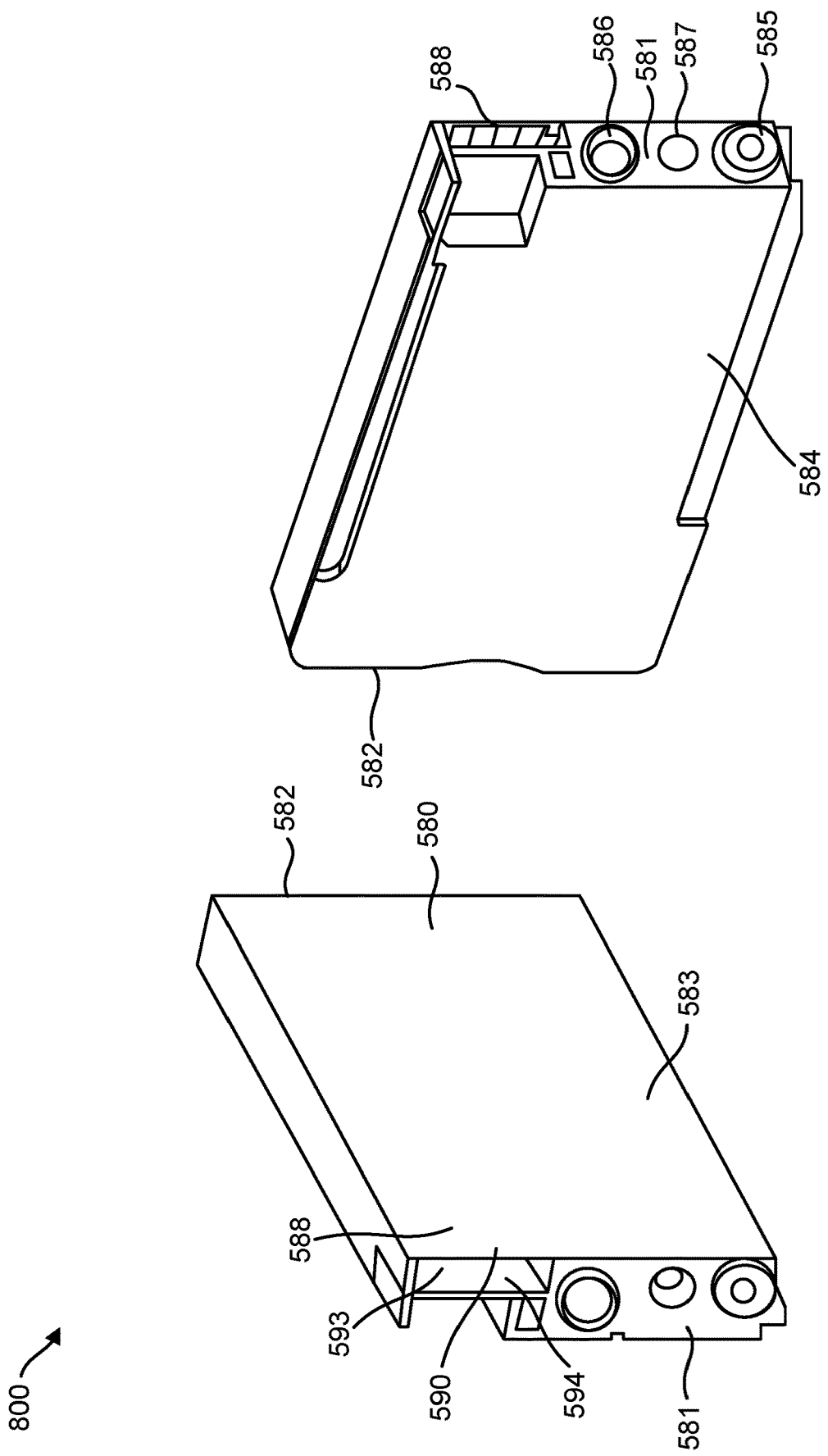
FIGS. 8A and 8B are perspective views of another example print liquid supply cartridge.
Figure 9:
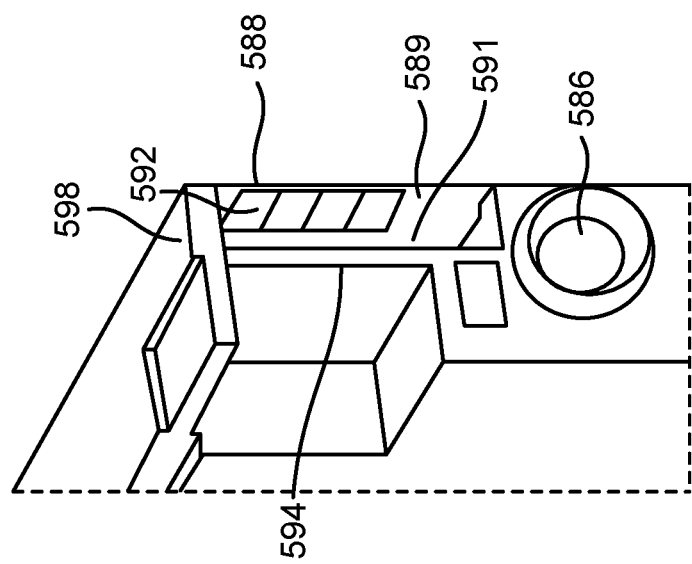
FIG. 9 is a magnified view of part of the example cartridge.

FIGS. 8A and 8B are perspective views of another example print liquid supply cartridge 800. FIG. 9 is a magnified view of part of the example cartridge 800. The same reference numerals are used for like parts. The cartridge 800 has a housing 580 which encloses an internal volume in which the print liquid, such as ink or agent, can be stored. The housing 580 has a front end 581, a rear end 582, and first and second sides 583, 584 extending from the front end to the rear end. A print liquid outlet 585 and a gas inlet 586 may be provided on the front end. The print liquid outlet 585 may be provided closer to the bottom than to the top of the front end 581. The gas inlet 586 may be positioned above the print liquid outlet 585. The front end may also have a print liquid inlet 587 to enable the cartridge to be filled or re-filled with print liquid.

In the example of FIGS. 8A, 8B, and 9, there may be provided a datum surface 593 across the recess from the internal side 589 of the first wall 588. A rib 598 may support the first wall 588. In the example shown, the datum surface is a side of a second wall 594 facing towards the recess 591. The datum surface 593 helps ensure smooth installation and removal of the print liquid supply cartridge to and from a printer.

In some examples, the print liquid supply cartridge 800 may include a conductor or conductors that are situated from an inside to an outside of the print liquid supply cartridge 800. For example, a first conductor may be a serial data line and/or a second conductor may be a clock line. In some examples, a third conductor may be a power line and/or a fourth conductor may be a ground line. In some examples, the conductor or conductors may be coupled to the electrical connection pad or pads 592. The electrical connection pad(s) 592 may be situated in the recess 591.

In some examples, the electrical connection pad(s) 592 and the conductor(s) may be supported by a housing component. For example, the electrical connection pad(s) and the conductor(s) may be supported by a lid described herein. For instance, the electrical connection pad(s) and the conductor(s) may be supported by the first wall 588, which may be a first wall 588 of a lid. In some examples, the print liquid supply cartridge 800 includes a sensor or sensors. In some examples, the sensor(s) may be supported by the lid and/or the first wall 588.

In some examples, the print liquid supply cartridge 800 may include a print liquid interface or interfaces. A print liquid interface is an interface for the passage of print liquid.

Examples of a print liquid interface may include the print liquid outlet 585 and the print liquid inlet 587, which may be included in the front end 581 of the print liquid supply cartridge.

The invention claimed is:

1. A print liquid supply unit, comprising:
   a first housing component comprising an alignment feature;
   sensor circuitry; and
   a non-conductive sensor support secured to the first housing component with the alignment feature, wherein the sensor support is disposed inside of a print liquid reservoir of the print liquid supply unit.

2. The print liquid supply unit of claim 1, further comprising a first conductor and a second conductor, wherein the first conductor is a serial data line and the second conductor is a clock line.

3. The print liquid supply unit of claim 2, further comprising a third conductor and a fourth conductor, wherein the third conductor is a power line and the fourth conductor is a ground line.

4. The print liquid supply unit of claim 1, wherein the alignment feature comprises a snap-fit feature to secure the sensor support to the first housing component.

5. The print liquid supply unit of claim 1, further comprising a second housing component comprising an interference component that maintains the sensor support on the alignment feature.

6. The print liquid supply unit of claim 1, wherein the alignment feature is situated through a slot in the sensor support.

7. The print liquid supply unit of claim 1, wherein the sensor circuitry comprises a print liquid level sensor and a strain sensor.

8. The print liquid supply unit of claim 1, further comprising a front end with at least one print liquid interface, a bottom, and a top, wherein the print liquid supply unit comprises a recess in and between the front end and the top, wherein an electrical connection pad is situated in the recess and coupled to the sensor circuitry.

9. The print liquid supply unit of claim 8, wherein the electrical connection pad and a conductor are supported by the first housing component.

10. The print liquid supply unit of claim 9, wherein the sensor circuitry is connected to the conductor.

11. The print liquid supply unit of claim 1, further comprising a print liquid inlet and a gas inlet of the print liquid supply unit.

12. A print liquid container, comprising:
   a sensor support disposed inside of a print liquid reservoir of the print liquid container;
   a container property sensor attached to the sensor support; and
   a fastener to fasten the sensor support to a lid of the print liquid container, wherein the property sensor and the sensor support are attached to the lid to detect a deflection of the lid.

13. The print liquid container of claim 12, wherein the fastener is a retainer.

14. The print liquid container of claim 12, wherein the fastener is welded to the lid.

15. The print liquid container of claim 12, wherein the fastener is a screw.

16. The print liquid container of claim 12, wherein the fastener is an adhesive.

17. The print liquid container of claim 12, wherein the fastener is a pressure sensitive adhesive.

18. The print liquid container of claim 12, wherein the fastener is cured with heat or light.

19. An ink supply unit, comprising:
   a carrier disposed inside of an ink reservoir of the ink supply unit;
   a digital ink level sensor and a strain sensor supported by the carrier; and
   a lid, wherein the carrier is welded to the lid to enable the strain sensor to detect a deflection of the lid.

20. The ink supply unit of claim 19, wherein the carrier is welded to the lid with laser welding.

21. The ink supply unit of claim 20, wherein the carrier is welded to the lid with ultrasonic welding or vibration welding.

22. The ink supply unit of claim 19, wherein the lid comprises a laser transmissive component and a laser absorbing component.

\* \* \* \* \*